(12) United States Patent
Kucher et al.

(10) Patent No.: US 7,178,446 B2
(45) Date of Patent: Feb. 20, 2007

(54) CYLINDER ROD WITH POSITION SENSOR SURFACE MARKINGS

(75) Inventors: Trent Steven Kucher, Peoria, IL (US); Karen Renee Raab, Peoria, IL (US); Xiangyang Jiang, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 46 days.

(21) Appl. No.: 11/066,287

(22) Filed: Feb. 28, 2005

(65) Prior Publication Data

US 2006/0191406 A1    Aug. 31, 2006

(51) Int. Cl.
*F01B 25/26*    (2006.01)
*B23K 26/00*   (2006.01)

(52) U.S. Cl. ............................ 91/1; 92/5 R
(58) Field of Classification Search .......... 91/1; 92/5 R
See application file for complete search history.

(56) References Cited

U.S. PATENT DOCUMENTS

| | | | |
|---|---|---|---|
| 4,547,649 A | 10/1985 | Butt et al. | |
| 4,794,680 A | 1/1989 | Meyerhoff et al. | |
| 4,822,987 A | 4/1989 | Goldenfield et al. | |
| 4,879,457 A | 11/1989 | Ludden | |
| 4,884,820 A | 12/1989 | Jackson et al. | |
| 5,023,437 A | 6/1991 | Speicher | |
| 5,089,683 A | 2/1992 | Stephenson et al. | |
| 5,143,578 A | 9/1992 | Luthi | |
| 5,543,269 A | 8/1996 | Chatterjee et al. | |
| 5,632,916 A | 5/1997 | Lappalainen et al. | |
| 5,843,599 A | 12/1998 | Paz-Pujalt et al. | |
| 5,855,969 A | 1/1999 | Robertson | |
| 5,918,199 A * | 6/1999 | Yang et al. .................. 702/150 |
| 6,068,966 A | 5/2000 | Koga | |
| 6,189,663 B1 * | 2/2001 | Smith et al. ........... 188/322.22 |
| 6,327,791 B1 * | 12/2001 | Norcross et al. ............... 33/706 |
| 6,532,132 B2 | 3/2003 | Tsujimoto et al. | |
| 6,653,593 B2 | 11/2003 | Lizotte et al. | |
| 6,764,016 B2 | 7/2004 | Robertson et al. | |
| 6,834,574 B2 * | 12/2004 | Neumann ........................ 91/1 |
| 6,941,827 B2 * | 9/2005 | Krone et al. ................ 73/865.9 |
| 2001/0036587 A1 | 11/2001 | McCay et al. | |
| 2003/0045412 A1 | 3/2003 | Schulz et al. | |

FOREIGN PATENT DOCUMENTS

WO    WO 95/01510    1/1995

* cited by examiner

*Primary Examiner*—Thomas E. Lazo
(74) *Attorney, Agent, or Firm*—Finnegan, Henderson, Farabow, Garrett & Dunner

(57) ABSTRACT

A cylinder rod with wear-resistant surface markings is provided. The cylinder rod may include a rod substrate, a thermal-spray coating disposed on a surface of the substrate, and one or more surface markings disposed on the coating at predetermined locations along the length of the cylinder rod.

27 Claims, 3 Drawing Sheets

CYLINDER ROD WITH POSITION SENSOR SURFACE MARKINGS

TECHNICAL FIELD

This disclosure pertains generally to surface markings and, more particularly, to surface markings formed on a thermal-spray coating of a hydraulic cylinder rod.

BACKGROUND

Many construction and earth moving machines use hydraulic or pneumatic cylinders to move work tools such as buckets on backhoes, loaders, and excavators. The cylinders may include a cylinder chamber at least partially filled with hydraulic fluid. A cylinder rod may be configured to slide along an axis of the cylinder chamber, and hydraulic fluid may be introduced into the chamber or removed from the chamber to extend or retract the rod. Often, the rod position must be known so that movement of the work tool can be monitored and controlled.

Cylinder rod surface markings, such as bar codes, may help to determine the position of the rod. The surface markings may be positioned at predetermined intervals along the cylinder rod, and each marking may correspond to a different location on the rod. In operation, a sensor positioned near the cylinder rod may identify a specific surface marking, which may correspond with a specific rod location.

Over time, surface markings on any material may wear or fade due to friction, heat, and/or corrosion. Further, a certain degree of wear may make the surface markings unrecognizable to a sensor, thereby preventing accurate determination of the rod position. Thus, there is a need for surface markings that are more resistant to wear and corrosion.

One method for producing a surface marking on a material is disclosed in U.S. Pat. No. 5,632,916 issued to Lappalainen on May 27, 1997 (hereinafter the '916 patent). The '916 patent describes a method for marking a chromium-plated metal bar. The method includes producing a series of overlapping, colored spots on the bar by exposing the bar to successive laser pulses.

While the method of the '916 patent may produce a suitable marking for some applications, the method has several drawbacks. The surface marking produced by the method of the '916 patent may not withstand repeated exposure to friction and wear produced on a hydraulic cylinder rod. Further, the chromium-plated surface of the metal bar may cause more wear on cylinder-head seals as compared to other materials. In addition, operation of the marking laser may be expensive and time consuming.

The present disclosure is directed to overcoming one or more of the problems or disadvantages in the prior art cylinder rod surface markings.

SUMMARY OF THE INVENTION

One aspect of the present disclosure includes a cylinder rod with wear-resistant surface markings. The cylinder rod may include a rod substrate, a thermal-spray coating disposed on a surface of the substrate, and one or more surface markings disposed on the coating at predetermined locations along the length of the cylinder rod.

A second aspect of the present disclosure includes a method for producing surface markings on a cylinder rod. The method may include producing a cylinder rod substrate, applying a coating material to the cylinder rod substrate using a thermal-spray process, and producing one or more markings on the coating material.

A third aspect of the present disclosure includes a work machine. The work machine may include at least one hydraulic system having a cylinder chamber, at least one cylinder rod configured to move along a longitudinal axis of the cylinder chamber, a thermal-spray coating disposed on a surface of the cylinder rod, and one or more surface markings produced on the thermal-spray coating and disposed at predetermined locations along the length of the cylinder rod. The work machine may further include a sensor configured to identify the one or more surface markings.

DETAILED DESCRIPTION

Figure 1:
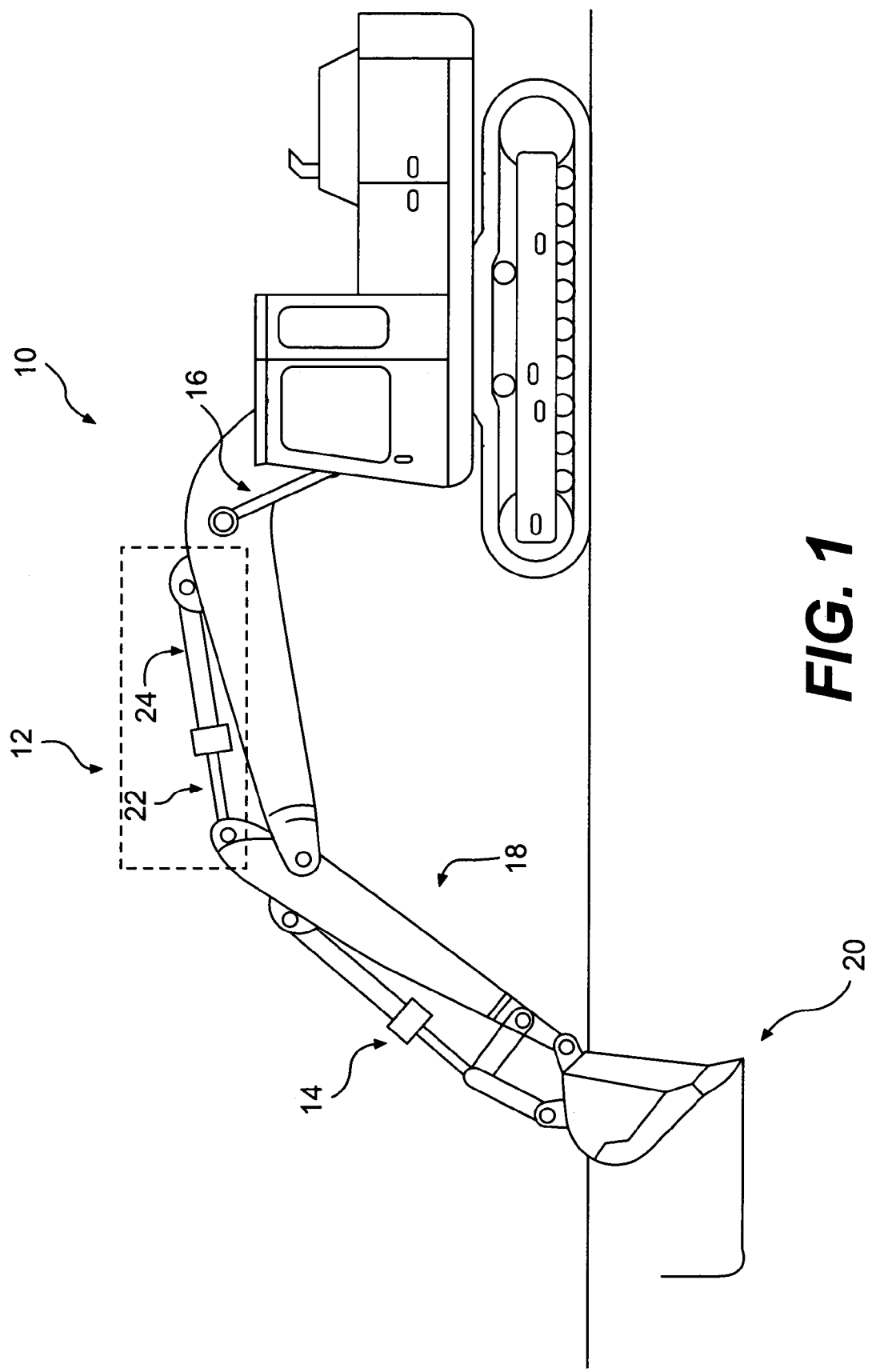
FIG. 1 illustrates a work machine according to an exemplary disclosed embodiment.

FIG. 1 illustrates a work machine 10 of the present disclosure. While work machine 10 is shown as an excavator, work machine 10 may include any type of work machine that includes one or more hydraulic systems. Such work machines may include, for example, track-type tractors, dump trucks, skid steers, aircraft, boats, cranes, etc. As illustrated, work machine 10 may include several hydraulic cylinder systems 12, 14, 16, which may control the movement of an excavator arm 18 and/or a bucket 20.

Figure 2:
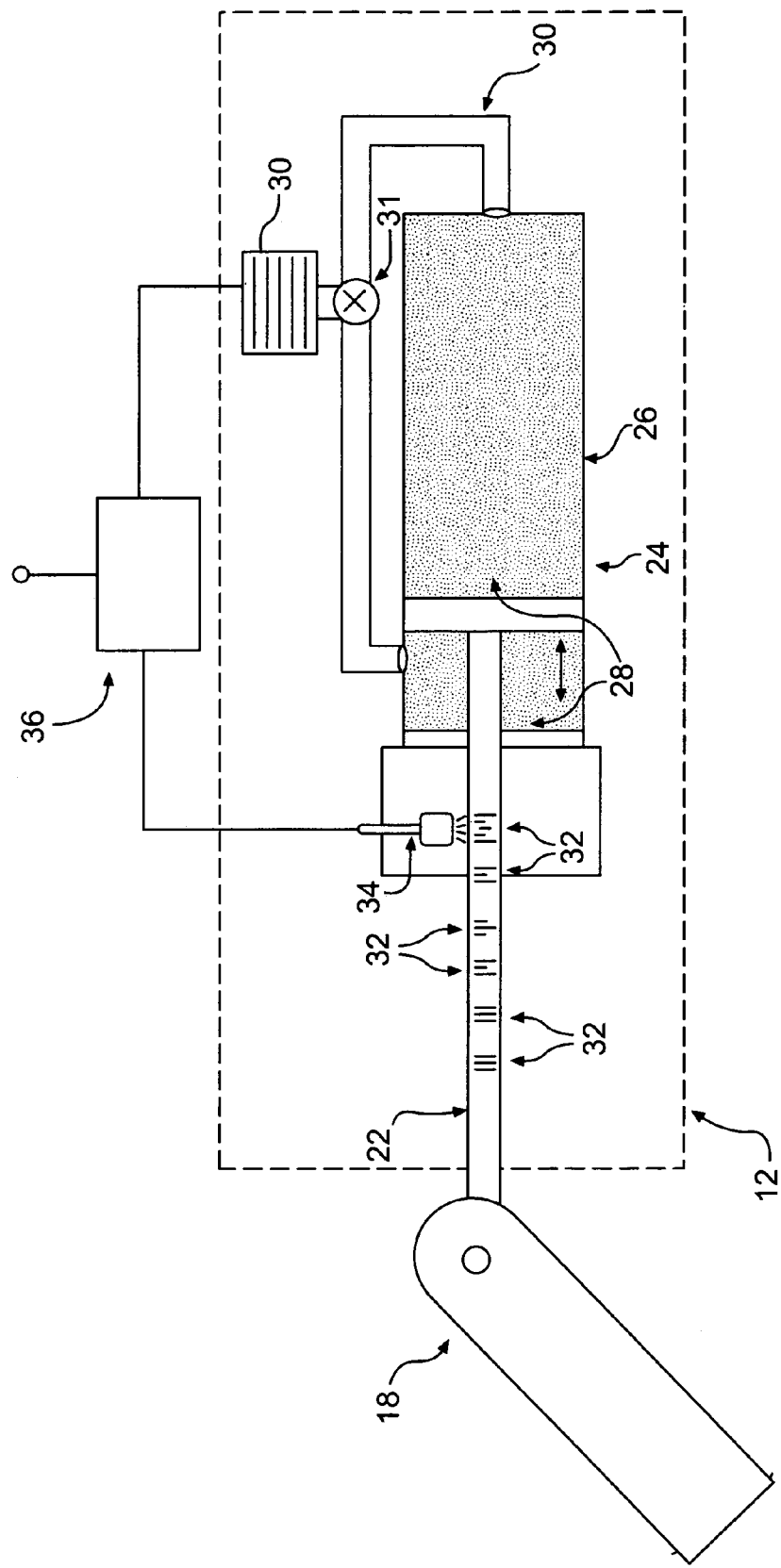
FIG. 2 illustrates a hydraulic cylinder system including a system for determining the stroke cycle position of a cylinder rod, according to an exemplary disclosed embodiment.

Hydraulic cylinder systems 12, 14, 16 may include a cylinder rod 22 and cylinder 24. During operation, cylinder rod 22 may slide longitudinally within a chamber (as shown in FIG. 2) of cylinder 24. Cylinder rod 22 and/or cylinder 24 may be mechanically coupled to one or more components of work machine 10, including excavator arm 18. The movement of cylinder rod 22 within cylinder 24 may provide power to and control the movement of one or more components of work machine 10.

FIG. 2 illustrates a more detailed view of hydraulic cylinder system 12 according to an exemplary disclosed embodiment. Cylinder 24 may include a cylinder chamber 26, which may be at least partially filled with a hydraulic fluid 28. A fluid pump 30 may be configured to control the amount of hydraulic fluid 28 within cylinder chamber 26, and cylinder rod 22 may be coupled with a component of work machine 10 (as shown in FIG. 1), such as excavator arm 18. In addition, a valve system 31 may control the flow of fluid from pump 30 to cylinder chamber 26 to allow extension and retraction of cylinder rod 22. Further, cylinder system 12 may include multiple pumps and/or cylinder rods, and each pump may control the flow of hydraulic fluid 28 to multiple cylinder systems.

Figure 3:
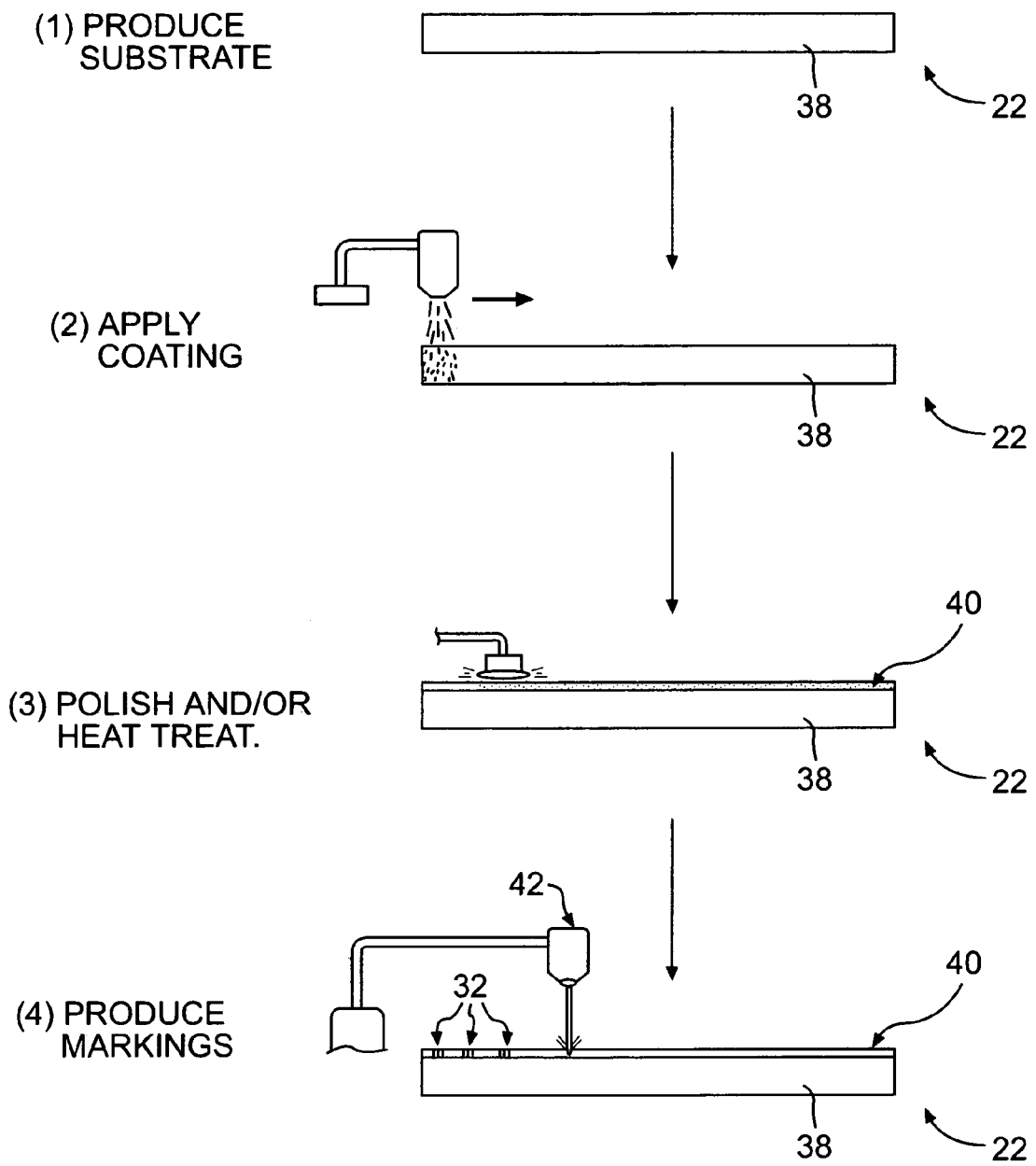
FIG. 3 illustrates a method of producing surface markings on a cylinder rod according to an exemplary disclosed embodiment.

During operation, it may be desirable to monitor the position of cylinder rod 22 within cylinder 24. Cylinder system 12 may further include a system for determining the stroke cycle position of cylinder rod 22 within cylinder 24, including one or more surface markings 32 disposed on a surface of cylinder rod 22 and at least one sensor 34 positioned at a predetermined location with respect to cylinder system 12. Sensor 34 may be configured to identify the one or more surface markings 32 on a surface of cylinder rod 22. Further, in one embodiment, surface markings 32 may be produced on a thermal-spray coating 40 disposed on a surface of cylinder rod 22 (as shown in FIG. 3).

As illustrated, cylinder system 12 is a hydraulic cylinder system. However, cylinder system 12, along with surface markings 32 and sensor 34 may be included in any system in which it may be desirable to monitor the position of a rod within a cylinder. Such systems may include, for example, struts, oil-drilling equipment, nuclear fuel rods, engine pistons, locks, and/or valves.

Surface markings 32 may be selected from a number of suitable marking types. For example, any type of optically, electrically, or magnetically recognizable data may be selected for surface markings 32. Surface markings 32 may be configured to include variations in surface color, surface texture, and/or optical reflectivity on a surface of cylinder rod 22. Further, surface markings 32 may include any type of machine recognizable data set such as bar codes, letters, numbers, or any other suitable surface pattern. In addition, a single cylinder rod may include multiple types of surface markings 32.

Referring again to FIG. 2, sensor 34 may be configured to recognize each of the one or more surface markings 32 on cylinder rod 22. Sensor 34 may be configured to detect the specific type of marking selected for surface markings 32, such as a bar code, letter, number, or any other suitable data marking. Further, sensor 34 may be configured to identify one surface marking 32 at a time, or to identify multiple surface markings 32 simultaneously.

Sensor 34 may be selected from a number of suitable sensor types. For example, sensor 34 may include a laser scanner, a charge-coupled device (CCD) scanner, a complimentary metal-oxide semiconductor (CMOS) scanner, a radio-frequency sensor, a fixed-focus optics device, or any other sensor 34 that may be configured to detect surface markings 32.

In one embodiment, sensor 34 may include a CCD scanner or a CMOS scanner, which may be configured to identify surface markings 32. CCD scanners and CMOS scanners may use a technique whereby markings 32 are imaged, digitized, and electronically sampled by built-in photo-detectors. The photo-detectors may be configured to detect and process contrasting colors and/or surface variations of surface markings 32, and sensor 34 may convert the contrasting colors and/or surface variations into a known code language, which may be associated with a specific marking location.

In another embodiment, sensor 34 may include a laser scanner, which may be configured to identify surface markings 32. Laser scanners may project a beam of light off an oscillating mirror or rotating prism and generate a scan line produced by a rapidly moving laser spot. Like CCD and CMOS scanners, laser scanners can detect contrasting colors and/or surface variations and convert the detected information into a known code language.

Sensor 34 may be positioned at a number of locations with respect to cylinder rod 22, and multiple sensors 34 may be used. Some sensors may have a predetermined line-of-sight and depth-of-field. The line-of-sight and depth-of-field of sensor 34 may define a direction and distance corresponding to a volume in which an object or surface marking 32 can be identified by sensor 34. The line-of-sight and depth-of-field of sensor 34 may be selected or controlled. Further, based on the selected depth-of-field and line-of-sight, sensor 34 may be positioned at a certain distance from and at a suitable orientation with respect to cylinder rod 22.

Surface markings 32 may be positioned on predetermined segments of cylinder rod 22. Each segment may correspond to a specific location on cylinder rod 22. Further, when a specific segment of cylinder rod 22 is moved within the depth-of-field and line-of-sight of sensor 34, sensor 34 may detect surface marking 32 located on the specific segment of cylinder rod 22 and may produce an output corresponding to the position of cylinder rod 22.

Sensor 34 may communicate with other components or subsystems of work machine 10 to facilitate operation of work machine 10. For example, sensor 34 may produce an output indicative of the position of cylinder rod 22. The output may include an electrical or audible signal, which may be communicated to a subsystem of work machine 10 or to personnel operating work machine 10.

In one embodiment, sensor 34 may communicate with a work machine control unit 36. Control unit 36 may include, for example, an electrical control unit (ECU) of a vehicle or work machine. Alternatively, or in addition, control unit 36 may include an operator control panel, which may be configured to provide information to personnel controlling the movement of work machine 10. Further, control unit 36 may include one or more mechanically activated sensors and/or actuators.

Sensor 34 and/or control unit 36 may be configured to monitor and/or control the movement of cylinder rod 22 based on a sensed position of cylinder rod 22. For example, sensor 34 and/or control unit 36 may coordinate the movement of several hydraulic systems 12, 14, 16 to produce a predefined movement pattern for excavator arm 18. Further, sensor 34 and/or control unit 36 may be configured to limit movement of cylinder rod 22 to certain ranges.

Fluid pump 30 may be selected from a variety of suitable fluid pump types, and multiple pumps may be used. For example, fluid pump 30 may include a fixed displacement pump, a variable-displacement pump, and/or a gear pump. The specific pump type may be selected based on the type of work machine, desired power output, fuel-efficiency, pump size, and cost. Fluid pump 30 may communicate with other components of work machine 10 including sensor 34, a work machine ECU, and/or an operator control panel. In addition, a single pump may provide power to multiple hydraulic cylinder systems 12, 14, 16.

In one exemplary embodiment, surface markings 32 may be produced on a coating 40 disposed on a surface of cylinder rod 22. As shown in FIG. 3, production of cylinder rod 22 and surface markings 32 may include selecting an appropriate rod substrate 38 (Step 1), which may optionally be cleaned and degreased. Next, a coating material may be applied to substrate 38 (Step 2) to form coating 40, and coating 40 may be polished and/or post-heat treated (Step 3). Finally, surface markings 32 may be formed on coating 40 using a marking system 42 (Step 4).

Cylinder rod substrate 38 may be selected from a number of suitable materials. Such materials may be selected from many different material types including, for example, one of many different steels, ceramics, and composite materials. In one embodiment, cylinder rod 22 may be produced from a medium-carbon steel, a tool steel, and/or stainless steel. Other materials may be selected based on desired applications and physical properties, such as, strength, stiffness, toughness, and/or density.

Cleaning the surface of substrate 38 before applying a coating material may improve bonding of the coating material to substrate 38, thereby extending the life of coating 40 and surface markings 32. Cleaning may include a variety of processes. For example, substrate 38 may first be degreased with a chemical solvent, such as acetone. Additionally, or alternatively, substrate 38 may be cleaned by mechanical and/or electrochemical processes such as grit blasting, alkaline and/or acidic washing, water-jet roughening, laser blasting, and/or any other suitable technique or combination of techniques.

The coating material may be applied to substrate 38 using a number of suitable application processes. In one embodiment, the coating material may be applied using a thermal-spray process. Suitable thermal-spray processes may include plasma spray, flame spray, high-velocity oxy-fuel (HVOF), high-velocity air-fuel (HVAF), detonation gun spray, combustion-flame spraying, two-wire electric-arc spraying, non-transferred electric-arc spraying, kinetic spray and cold spray. Additionally, hybrid processes such as laser-assisted thermal spray or thermal spray with arc lamp heating may be used. Any suitable thermal-spray process may be selected to apply a coating material to substrate 38.

Thermal-spray processes can involve spraying of a material onto a substrate. In some thermal-spray processes, all or part of the material may be heated and/or melted. In these processes, powder or wire feedstock materials may be heated by an electric arc/plasma or oxy-fuel combustion process, and the heated material may be accelerated toward substrate 38 by a flame. The resulting impact between the material and substrate 38 can create a layer of material on a surface of substrate 38. The specific thermal-spray process, processing parameters, and coating materials may be selected based on cost and desired physical properties including, hardness, wear-resistance, porosity, and/or effects on other components.

Thermal-spray processes may also include cold-spray processes. Cold spray processes may include spraying materials using a high-velocity gas jet, wherein the materials are at room temperature or only slightly heated. In these processes, the sprayed material may contact a surface of substrate 38, where the material may plastically deform and bond with the underlying substrate 38. Any suitable thermal-spray process may be selected.

Many suitable coating materials are available for producing coating 40 and surface markings 32 on cylinder rod 22. For example, suitable coating materials may include various metals, alloys, ceramics, and/or metal-matrix composite materials. The specific coating material may be selected based on desired wear-resistance, porosity, hardness, friction coefficients with adjacent components, corrosion resistance, cost, compatibility with substrate materials, and/or compatibility with surface-marking processes. In one embodiment, coating 40 may be produced from a chrome composite material. In another embodiment, coating 40 may be produced from a composite including at least one of carbides, borides, and nitrides. In still another embodiment, coating 40 may be produced from one or more monolithic materials.

Suitable chrome composite materials may include a range of compositions and composite structures. In one embodiment, the chrome composite materials may include a ferro-chrome-nickel composite. In another embodiment, the chrome composite material may include a chrome carbide-boride structure.

Chrome composites may be produced using a number of processes. For example, a chrome composite material may be produced from a mixture of ferrochrome and nickel-based materials. A suitable chrome carbide-boride composite may be produced from a mixture of ferrochrome materials, nickel-based materials, and boron-containing materials. Such materials may be combined in a range of compositions. Further, various methods for generating the composite materials may be used including, for example, spray drying and sintering, atomization, gas atomization, sintering and crushing, chemical vapor deposition, and cladding.

The ferrochrome material may be selected from among many materials that include at least some iron, chrome, and/or carbon. For example, in one embodiment, the ferrochrome material may include at least one of $(CrFe)_7C_3$, $(CrFe)_{23}C_6$, and $(CrFe)_3C_2$. Further, the ferrochrome material may be provided in powder form, ingot form, or any other suitable form for obtaining the ferrochrome precursor material.

Similarly, nickel-based materials and boron-containing materials may be provided in a number of forms and compositions. Suitable nickel-based materials may be selected from a variety of compounds that may serve as a nickel source. In one embodiment, the nickel-based material may be provided as substantially pure nickel (i.e., greater than 90% purity). Likewise, the boron-containing material may be provided in a number of forms, including, for example, ferroboron, iron-boride, and/or nickel-boride. Further, the nickel-based material and/or boron-containing material may be provided in powder form, ingot form, or any other suitable form for obtaining the nickel-based or boron-containing precursor material.

The ferrochrome material, nickel-based material, and/or boron-containing material may be mixed in a number of ways to produce a chrome composite and/or chrome carbide-boride composite. For example, each material may be provided as a powder, which may be mechanically mixed as a dry powder or in a solvent to form a slurry. Alternatively, the precursor materials may be melted from powder or ingot form and mixed in a melt.

The weight percentages of the constituents of the composite materials may be controlled by selecting appropriate combinations of precursor materials. The chrome composite and/or carbide-boride composites may have a carbon content of up to about 14 weight percent and a chrome content of up to about 65 weight percent. Iron may be included in an amount of up to about 65 weight percent, and nickel may represent up to about 40 weight percent. In the case of chrome carbide-boride composites, boron may be included in an amount up to about 19 weight percent.

Further, various additional materials may be added to the ferrochrome, nickel, and/or boron materials. For example, activated carbon and/or graphite may be added to the mixture. Similarly, in some embodiments, one or more of silicon, titanium, niobium, vanadium, tantalum, molybdenum, tungsten, and manganese may be added. For certain applications, any one of these materials may be limited to no more than 5% by weight of the composite material, and a combination of these materials may be limited to 10% by weight of the composite material.

The disclosed chrome materials may have a composite structure. Particularly, in one embodiment, at least some of the particles of the composite chrome powder may include Fe—Cr-carbide particles dispersed within at least one of a nickel, nickel-chromium, or iron-chrome matrix. To make the composite powder, a metal powder may be combined with a ferrochrome powder using a variety of production processes. Other composite structures may be generated, however. For example, the chrome composite powder may include particles having a ferrochrome core material. A nickel layer and/or a nickel-chromium layer may be applied to the ferrochrome core material to provide a composite structure.

The composite structure may be formed by combining metal and ferrochrome powders. For example, if a metal powder (e.g. nickel (Ni) or chromium (Cr)) is mixed with a carbon-containing ferrochrome powder and then spray dried, a composite structure may be produced. This composite structure may include hard Fe—Cr-carbide particles dispersed relatively uniformly in a softer, tougher Ni matrix.

As noted above, a number of production processes may be used to produce a variety of composite structures based on the desired application. For example, in one embodiment, a chrome composite material may be produced using one of sintering, spray drying, sintering and crushing, cladding and/or atomization. Alternatively, a desired combination of ferrochrome, nickel-based, and boron/containing materials may be selected, and these components may be individually or simultaneously applied by a coating process, such as a thermal-spray process. The thermal-spray process may at least partially mix the components and produce a composite chrome structure.

Coating 40 may also be produced from any other suitable composite material. Such materials may include various carbides, borides, nitrides, and/or mixtures of carbides, borides, and/or nitrides. For example, suitable carbide materials may include titanium carbide, chrome carbide, and tungsten carbide. Further, suitable borides and nitrides may include, for example, chrome boride, molybdenum boride, titanium boride, nickel boride, titanium nitride, and/or chrome nitride. In one embodiment, the material may include carbide, boride, and/or nitride particles dispersed in a matrix material including, for example, Ni, Ni—Cr, or cobalt.

Coating 40 may also be produced from a number of suitable monolithic materials. Monolithic materials, unlike composites, may include no distinct particles dispersed in a matrix. Such materials may include, for example iron or nickel based materials. These materials may further include one or more of boron, silicon, chrome, molybdenum, tungsten, and/or any other suitable materials.

Coating 40 may have a range of suitable thicknesses. The thickness of coating 40 may be selected based on a number of factors including, for example, material cost, production time, desired application, and/or desired longevity. In one embodiment, coating 40 may have a thickness between about 10 microns and about 400 microns.

After application of the coating material, coating 40 may be further treated by polishing and/or heating. Polishing may produce a smooth, low-friction surface on cylinder rod 22. Further, the degree of surface polishing may be selected based on the desired application. For example, a smooth polish may be desirable to reduce friction with some moving parts. However, a certain degree of surface roughness may be desirable to maintain a layer of lubricant or grease on cylinder rod 22.

A number of heat treatment processes may be used to heat coating 40. Such processes may include, for example, induction heating, batch furnace heating, arc-lamp heating, and/or laser treatment. Heat treatment may strengthen the bond between coating 40 and substrate 38. Further, heat treatment may reduce stresses between coating 40 and substrate 38 or within coating 40, while facilitating structural changes which may improve the hardness and/or wear resistance of coating 40.

Surface markings 32 may be produced using a number of different suitable techniques. For example, a variety of electrical, mechanical, thermal, and/or chemical techniques may be used to produce surface markings 32. The marking process may be selected to produce color variations and/or to etch predefined patterns on coating 40. Further, any suitable marking technique may be used including, for example, etching, engraving, embossing, surface annealing, and/or printing.

In one embodiment, surface markings 32 may be produced by etching or engraving coating 40. Etching and/or engraving may include removing a small amount of material from predefined sections of coating 40 by vaporization, melting, chemical degradation, and/or mechanical wear. A number of suitable etching and engraving processes are available. For example, coating 40 may be etched using laser etching, plasma beam etching, chemical etching, and/or mechanical engraving techniques. The specific etching or engraving process may be selected based on cost, coating characteristics, production time, and/or the type of surface marking 32 being produced.

In another embodiment, surface markings 32 may be produced by producing color variations on coating 40. Color variations may be produced using a variety of processes including laser annealing, alloy deposition, chemical reactions, photolithography, and/or thermal treatment. For example, in one embodiment, coating 40 may have a certain color. A marking process, such as laser marking, may be used to produce a color change on certain sections of coating 40 such that surface markings 32 may include a pattern having a color that is different than surrounding sections of coating 40.

In still another embodiment, the marking process may be selected to both etch and produce color changes in sections of coating 40. For example, a laser-etching process may be selected to partially etch and anneal coating 40. Laser etching may vaporize a certain amount of material from predefined sections of coating 40, while the annealing process may produce color changes in the etched regions.

A number of different laser-marking processes may be used for producing surface markings 32. For example, marking system 42 may include a variety of different laser types including, for example, neodymium-YAG (Nd:YAG) lasers, carbon dioxide (CO2) lasers, and/or sapphire lasers. Further, the specific laser power and processing parameters may be selected based on the desired type of surface markings 32 and coating material being used. Further, specific sections of coating 40 may be exposed to laser energy to produce a color change on and/or etch sections of coating 40 corresponding to a desired surface marking 32.

In another embodiment, the marking process may include an alloy deposition process. An alloy deposition process may include depositing chemicals onto predefined sections of coating 40. The deposited chemicals may be subsequently heated by laser, batch furnace, arc/lamp, and/or induction heating to react with portions of coating 40, thereby producing a pattern corresponding to the location of the deposited chemicals. Further, alloy deposition processes may be used in conjunction with etching and/or surface-coloring processes.

It should be noted that coating 40 may be heat treated and/or polished before, after, or during production of surface markings 32. For example, in one embodiment, coating 40 may be produced having certain physical properties including a certain hardness and/or melting point. Heat treatment may change these physical properties. In one embodiment, it-may be desirable to produce surface markings 32 before heat treating, since the change in physical properties caused by heat treatment may make production of surface markings more difficult. In another embodiment, it may be desirable to heat treat and/or polish coating 40 before producing surface markings 32 to prevent undesirable changes in surface markings 32 caused by heat treatment and/or polishing coating 40. In still another embodiment, it may be desirable to heat treat and/or polish coating 40 both before and after production of surface markings 32.

INDUSTRIAL APPLICABILITY

The present disclosure provides a cylinder rod with wear-resistant surface markings 32. Surface markings 32 may facilitate monitoring of the cylinder rod stroke cycle position. The system can be used in any type of machine that includes one or more hydraulic systems. The system may have further applicability on any equipment where it is desired to determine the position of a movable rod.

The system may include a number of surface markings 32 engraved on a wear-resistant, thermal-spray coating 40 of a hydraulic system cylinder rod 22. Surface markings 32, being formed on wear-resistant coating 40, may provide several advantages over surface markings produced on chrome, steel, or other materials. Coating 40 may have improved wear resistance, and consequently, surface markings 32, being produced on coating 40, may last longer and may reduce replacement and repair costs. Coating 40 and surface markings 32 may also be more resistant to damage such as cracks and/or scratches, which may be caused by contact with other equipment or debris. In addition, since surface markings 32 may last longer, markings 32 may be engraved at a shallower depth than markings on chrome, steel, or other materials. The shallower depth may reduce production costs by decreasing the cycle time needed to produce markings 32 by laser, electrical, chemical, and/or mechanical processes. Further, shallower surface markings 32 may cause less wear on hydraulic cylinder head seals, thereby decreasing the rate of seal failure.

Coating 40 may also provide improved protection to cylinder rod substrate 38. Thermal-spray coatings may be applied in thicker layers, may have lower thermal conductivities, and may have higher corrosion and wear resistance than other materials. Thicker, more resistant coatings 40 may be less likely to fail and better able to withstand marking processes that may cause surface cracking. In addition, the lower thermal conductivity may reduce substrate thermal effects caused by some marking processes. Finally, coating 40 may be more porous than chrome or steel coatings. The increased porosity may improve material diffusion when alloy deposition methods are used to produce surface markings 32. Further, the increased porosity may help maintain a film of lubricant on the surface of coating 40, which may reduce wear on coating 40 and cylinder head seals.

It will be apparent to those skilled in the art that various modifications and variations can be made in the disclosed systems and methods without departing from the scope of the disclosure. Other embodiments of the disclosed systems and methods will be apparent to those skilled in the art from consideration of the specification and practice of the embodiments disclosed herein. It is intended that the specification and examples be considered as exemplary only, with a true scope of the disclosure being indicated by the following claims and their equivalents.

What is claimed is:

1. A cylinder rod with wear-resistant surface markings, comprising:
   a rod substrate;
   a composite thermal-spray coating disposed on a surface of the rod substrate; and
   one or more surface markings disposed on the coating at predetermined locations along the length of the cylinder rod.

2. The cylinder rod of claim 1, wherein the composite material includes a chrome composite material.

3. The cylinder rod of claim 2, wherein the chrome composite material includes:
   a ferrochrome component; and
   a nickel-based component.

4. The cylinder rod of claim 3, wherein the chrome composite material further includes a boride component.

5. The cylinder rod of claim 4, wherein the boride component includes iron-boride.

6. The cylinder rod of claim 4, wherein the boride component includes nickel-boride.

7. The cylinder rod of claim 3, wherein the chrome composite material further includes at least one of activated carbon and graphite.

8. The cylinder rod of claim 1, wherein the composite material includes at least one of tungsten carbide, titanium carbide, chrome carbide, chrome boride, molybdenum boride, titanium boride, nickel boride, titanium nitride, and chrome nitride.

9. The cylinder rod of claim 1, wherein the one or more surface markings includes at least one bar code.

10. The cylinder rod of claim 1, wherein each of the one or more surface markings corresponds to a predetermined location on the cylinder rod.

11. The cylinder rod of claim 1, wherein the one or more surface markings include sections of the coating having a color that is different than a color of surrounding sections of the coating.

12. The cylinder rod of claim 1, wherein the one or more surface markings include etched sections of the coating.

13. A method for producing surface markings on a cylinder rod, comprising:
   producing a cylinder rod substrate;
   applying a composite coating material to the cylinder rod substrate using a thermal-spray process;
   producing one or more markings on the coating material.

14. The method of claim 13, wherein the thermal-spray process includes a high-velocity oxy-fuel process.

15. The method of claim 13, wherein the thermal-spray process includes a plasma-spray process.

16. The method of claim 13, wherein the thermal-spray process is selected from the group including a flame spray process, a high-velocity air-fuel process, a detonation gun spray process, a combustion-flame spraying process, a two-wire electric-arc spray process, a non-transferred electric-arc spraying process, a kinetic spray process and a cold spray process.

17. The method of claim 13, wherein the one or more markings are produced by exposing sections of the coating material to laser energy.

18. The method of claim 17, wherein exposing the coating material to laser energy vaporizes at least a portion of the coating material.

19. The method of claim 17, wherein exposing the coating material to laser energy produces a color change in the coating material.

20. The method of claim 13, wherein the composite material includes a chrome composite material.

21. The method of claim 13, wherein the composite material includes at least one of tungsten carbide, titanium carbide, chrome carbide, chrome boride, molybdenum boride, titanium boride, nickel boride, titanium nitride, and chrome nitride.

22. A work machine comprising:
   at least one hydraulic system including:
      a cylinder chamber;
      at least one cylinder rod configured to move along a longitudinal axis of the cylinder chamber;
      a composite thermal-spray coating disposed on a surface of the cylinder rod; and
      one or more surface markings produced on the thermal-spray coating and disposed at predetermined locations along the length of the cylinder rod; and
   a sensor configured to identify the one or more surface markings.

23. The work machine of claim 22, wherein the composite material includes a chrome composite material.

24. The work machine of claim 22, wherein the sensor is further configured to determine the stroke cycle position of the cylinder rod.

25. The work machine of claim 22, wherein the sensor includes a laser scanner.

26. The work machine of claim 22, wherein the sensor includes a charge-coupled device.

27. The work machine of claim 22, wherein the sensor includes a complimentary metal-oxide semiconductor scanner.

* * * * *